United States Patent Office 3,405,198
Patented Oct. 8, 1968

3,405,198
PROCESS FOR MAKING IMPACT RESISTANT INJECTION MOLDED POLYETHYLENE TEREPHTHALATE PRODUCTS
Walter Rein, Obernburg, and Erhard Siggel, Seckmauern, Germany, assignors to Glanzstoff A.G., Wuppertal, Germany
No Drawing. Continuation-in-part of application Ser. No. 296,380, July 19, 1963. This application Nov. 22, 1966, Ser. No. 596,093
Claims priority, application Germany, Nov. 25, 1965, V 29,798
8 Claims. (Cl. 260—873)

ABSTRACT OF THE DISCLOSURE

This invention is concerned with a process for the manufacture of impact-resistant polyethylene terephthalate products by homogeneously incorporating polyethylene into the polyester used for injection molding.

---

This application is a continuation-in-part of our copending application with Hilmar Roedel, Ser. No. 296,-380, filed July 19, 1963, now Patent No. 3,361,848 the disclosure of which is included herein by reference as fully as if it were set forth in its entirety.

Attempts have been made to produce molded articles from fiber-forming polyesters such as polyethylene terephthalate, and it is therefore known that the molten polyester can be molded by using the well-known injection molding process. However, at the present time, injection molded polyester products of this type have not been acceptable from a technical or commercial viewpoint because they exhibit poor dimensional stability and an unsatisfactory impact-strength, especially when subjected to temperatures above 100° C. for a prolonged period of time.

A particular object of the invention is to provide a process for making injection molded parts or articles from a normally fiber-forming polyester such as polyethylene terephthalate wherein improved impact strength is imparted to the molded product. Another object of the present invention is to provide a process for making injection molded polyethylene terephthalate products which have an improved impact strength even when subjected to elevated temperatures over a long period of time. Still another object of the invention is to provide impact-resistant injection molded polyethylene terephthalate products which exhibit improved dimensional stability. Yet another object of the invention is to provide a process for the injection molding of a fiber-forming polyester such as polyethylene terephthalate wherein it is possible to reduce the cylinder temperature or temperature of the molten polyester during injection molding.

These and other objects and advantages of the invention will become more apparent upon consideration of the following detailed specification.

It has now been found, in accordance with the present invention, that the foregoing objects and advantages can be achieved by injection molding polyethylene terephthalate as a molten composition in which there has been homogeneously distributed from 0.5 to 50% by weight, preferably about 5 to 40% by weight, of finely divided polyethylene. Particularly good results are achieved, in accordance with this invention, if there is also incorporated into the molding composition approximately 1 to 5% by weight of a polyolefin selected from the class consisting of polypropylene and poly-4-methylpentene. In both instances, the percentages by weight of the added polyolefin are calculated with reference to the weight of the polyethylene terephthalate.

Polyethylene terephthalate is a readily available fiber-forming polyester and is therefore representative of the fiber-forming polyesters which are obtained by polycondensing a saturated diol ester of an aromatic dicarboxylic acid as described more fully in the above-noted copending application. Various modified polyesters consisting essentially of polyethylene terephthalate are also quite suitable for the purposes of the present invention.

It can be readily shown that the impact strength of polyethylene terephthalate generally increases with increasing relative viscosity of the polyester. It is therefore especially desirable for purposes of the present invention to use a polyethylene terephthalate having a relative viscosity of about 1.8 to 2.1, since one thereby achieves maximum values of impact strength.

The polyethylene modifying agent used in the process of the invention preferably has a molecular weight of about 10,000 to 70,000, and for purposes of dimensioned stability, the polyethylene should have a second order transition point which is substantially below the second order transition point of the polyester. In general, this second order transition point of the polyethylene will fall in a range of about −70° C. to +20° C. The polyethylene can be prepared quite easily by conventional or known processes, and the achievement of special properties such as particle size and density can be readily accomplished by a skilled chemist.

Particularly good results are achieved with the process of the present invention so as to achieve especially high impact strength values and very good dimensional stability if one uses a polyethylene terephthalate injection molding composition which contains 10 to 30% by weight of polyethylene. Although good properties of impact resistance are imparted to the polyethylene terephthalate by polyethylene additions below 10% by weight, it was quite surprising to find that impact strength values could again be considerably increased by adding polyethylene in an amount of more than about 10% by weight up to approximately 30% by weight. It was also surprising that these larger amounts of the polyethylene modifying agent could be uniformly and homogeneously worked into the polyester without any tendency for the individual polymers to separate from each other and without any need for using special techniques during injection molding for producing flawless injection molded products. Above this preferred range of 10–30% by weight, the impact strength values again begin to decrease and it is sometimes difficult to obtain proper homogenization of the injection molding composition. However, by using finely divided polyethylene and proper mixing devices which provide a very intensive homogenization of the polyester and the polyethylene, it has been possible to incorporate even more than 50% by weight of polyethylene in a satisfactory manner.

It was further found, in accordance with the present invention, that the degree of improvement in the impact strength and notched impact strength of the injection molded polyethylene terephthalate products are not only dependent upon the additive amount of polyethylene, but it is also necessary to take into consideration the specific weight or specific gravity of the polyethylene used as the modifying agent. The impact-resistance of the injection molded products can thus be varied depending upon the particular specific weight of the polyethylene. Particularly favorable results are achieved by using polyethylene polymers having a low density, i.e. a low specific weight. In particular, it is desirable to use polyethylene which has a specific weight of approximately 0.915 to 0.930 as the modifying agent added to the injection molding composition.

The polyethylene can be added to the polyester during its initial preparation. For example, the addition of polyethylene may occur at the beginning or during the initial stages of the polycondensation of the diglycol terephthalate into a high molecular weight polyester. On the other hand, a somewhat simplified procedure is achieved by mixing both of the components, i.e. the polyester and the polyethylene, in the form of granules or powder which are melt blended together under conditions of intensive mixing. In order to avoid complications, the mixing or homogenizing of the polyester and the polyethylene should be accomplished after first decreasing the water content of the polymers, preferably below 0.01% by weight of water. Likewise, it is advisable to avoid contact of the molten polymers with atmospheric oxygen, for example by carrying out the mixing in an inert atmosphere such as nitrogen.

An especially homogeneous distribution of both components in one another is achieved if the granulated or powdery mixture is melted with a screw extruder wherein high shearing forces guarantee a very intensive mixing of the molten material. Also, it is very helpful to use a finely divided polyethylene with a very small particle size, for example from about 1 to 10 microns. It will be appreciated that a high degree of homogenization is desirable in order to achieve uniform molding compositions, and the impact resistance of the molded products is likewise improved by maintaining a high degree of homogenization.

The homogenized molten mixture of the polyester and polyethylene can either be directly injection molded or it can again be brought into granular form. This latter procedure is generally referred to as reverse granulation or simply regranulation. Further melt blending of the components can be accomplished by such regranulation and can also be carried out in a screw extruder under high shearing forces so as to be certain of obtaining a very homogeneous mixture.

In using the modified polyester molding composition of the present invention, it is possible to use any of the known process steps and variations of the injection molding process without any special measures or restrictions. Throughout all of the mixing, processing and molding steps to be used in accordance with the present invention, it is naturally important to avoid contact of the composition with moisture or air, particularly when the composition is in the molten state. Both the polyethylene and the polyethylene terephthalate may, of course, contain the usual matting agents and stabilizing additives such as heat stabilizers. Naturally, these other additives should also be distributed as finely as possible in the polymers, for example in the form of very fine particles.

The addition of the polyethylene modifying agent to the injection molding composition in accordance with the present invention also usually improves the dimensional stability, at least to an extent such that the injection molded products not only exhibit excellent impact-resistance but also satisfactory dimensional stability. For purposes of the present invention, it is generally desirable to heat set the injection molded product by subjecting it to an elevated temperature above about 100° C., i.e. at a temperature above the second order transition point of the polyester.

Especially good properties of impact strength, notched impact strength and also dimensional stability are obtained if in addition to the polyethylene additive one also homogeneously distributes in the polyethylene terephthalate injection molding composition approximately 1 to 5% by weight of finely divided polypropylene or poly-4-methylpentene. The addition of these particular polymers of longer chain mono-olefins, i.e. polyolefins of 3 to 6 carbon atom monoolefins, has a specially favorable effect on the dimensional stability of the injection molded products once they have been heat set. Not only is an enhanced dimensional stability obtained by this combination of the polyethylene with the other polyolefins, but also there is no impairment of the impact resistance as can result when adding only polypropylene or poly-4-methylpentene to the polyethylene terephthalate. In this respect, there appears to exist a certain synergistic effect in this combination of polyethylene and the other polyolefin additives. This particular embodiment of the invention is especially desirable where one wishes to achieve injection molded polyethylene terephthalate products which require both high impact strength and also accurately profiled and dimensionally stable molded articles.

The polyolefins of 3 to 6 carbon atom monoolefins can be introduced into the polyester before adding the polyethylene. However, they may also be added to the polyethylene terephthalate in admixture with the polyethylene, or they may even be added to the polyethylene-containing injection molding composition. Most importantly, both types of polyolefins must be thoroughly mixed into the polyester to provide an injection molding composition which is as homogeneous as possible. Therefore, when using a combination of polyolefins, it is also highly desirable that they be added in very finely divided form and then mixed under high shear stresses or even regranulated if necessary.

The relative viscosity of the polyethylene terephthalate, sometimes referred to as the solution viscosity, has been measured throughout this specification as a 1% solution of the polyester in m-cresol at 25° C. The relative viscosity of the polyethylene is measured in a 0.1% solution of the polymer in Decalin at 135° C. The values for the specific weight or specific gravity of the polyethylene is measured at a temperature of 20° C.

The following examples provide a further detailed explanation of the invention. All percentages are by weight unless otherwise indicated.

EXAMPLE 1

Several samples of 9.5 kg. each of polyethylene terephthalate with varying relative viscosity were mixed in granular form with 500 g. each of dry polyethylene particles having a density of 0.960, subsequently melted and molded into a strand by extruding and homogenizing with a single screw extruder at 270–280° C., and after cooling in water cut into granules. By gentle heating in vacuo and under a nitrogen atmosphere, the water content of the melt blended polymer mixture was brought below 0.01%. With the aid of a piston operated injection molding machine, the resulting injection molding composition was molded into standard test bars with dimensions of 4 mm. x 6 mm. x 50 mm., which were subjected to the following tests. Unmodified polyethylene terephthalate was injection molded in the same way for comparison.

First, the impact strength and the notched impact strength were determined according to DIN specification 53453 with striking pendulum 0.4 in accordance with DIN specification 51222 on the freshly produced test bars. This test showed in all instances an impact strength lying above 210 cm. kg./cm.$^2$ so that all of the bars passed the test unbroken. The values for the notched impact strength are contained in Table 1.

60 freshly produced test bars each were then subjected for 60 minutes to a temperature of 140° C. and thereafter, the impact strength was tested on 30 bars and the notched impact strength on the remaining 30 bars. The resulting data is also incorporated in Table 1 below. Each value of strength in this table represents the arithmetic average of 30 tests. For unbroken bars, a value of 210 cm. kg./cm.$^2$ was assumed.

TABLE 1

| Relative viscosity of the polyester | Impact strength after heat treatment in cm. kg./cm.$^2$ | | Notched impact strength in cm. kg./cm.$^2$ | | | |
|---|---|---|---|---|---|---|
| | | | Before heat treatment | | After 60 minutes at 140° C. | |
| | Polyester unmodified | Polyester with polyethylene | Polyester unmodified | Polyester with polyethylene | Polyester unmodified | Polyester with polyethylene |
| 1.53 | 34.2 | 48.2 | 2.3 | 3.1 | 1.9 | 2.6 |
| 1.57 | 58.7 | 99.2 | 2.3 | 3.7 | 2.1 | 3.3 |
| 1.65 | 98.0 | 177.0 | 2.4 | 4.4 | 2.0 | 3.6 |
| 1.80 | 197.0 | 210.0 | 2.6 | 6.4 | 2.2 | 4.1 |

The results shown in this table clearly demonstrate the substantial improvement of impact resistance of injection molded polyethylene terephthalate articles which can be achieved when modified with only 5% by weight of polyethylene.

EXAMPLE 2

Polyethylene terephthalate injection molding compositions were prepared in the same manner as in Example 1 in which an amount of 5 percent by weight of polyethylene was added. In this instance, there was used a polyethylene having a specific weight of 0.918. The test bars produced from the homogenized injection molding material were subjected to the same tests as described in Example 1. The results are contained in Table 2. The number of bars that remained unbroken in the impact strength tests is indicated in parentheses after the strength values determined as an arithmetic average of 30 individual tests.

TABLE 2

| Relative viscosity of the polyester | Notched impact strength in cm. kg./cm.$^2$ | | Impact strength in cm. kg./cm.$^2$ |
|---|---|---|---|
| | Before heat treatment | After 60 min. at 140° C. | After 60 min. at 140° C. |
| 1.54 | 4.2 | 2.8 | 95.8 (6) |
| 1.58 | 3.8 | 3.0 | 167.0 (21) |
| 1.63 | 4.4 | 4.1 | 196.0 (27) |
| 1.86 | 6.6 | 4.5 | 210.0 (30) |

If one compares the test values of this table with the test values of Table 1, it is possible to clearly recognize the advantageous use of a polyethylene having a lower density. Compared with the test results shown in Table 1 of moldings made of unmodified polyethylene terephthalate, it will be noted that the impact resistance has again tripled in some instances.

EXAMPLE 3

16 kg. of polyethylene terephthalate having a solution viscosity of 1.75 were homogenized in a conventional blender with 4 kg. polyethylene having a solution viscosity of 0.86, a density of 0.918 and a melt index of 13.16 g./10 min. measured according to ASTM specification D1238–57T at 230° C. with a piston of 2180 g., and then dried in the same manner as described in Example 1. Using a screw injection molding machine, the homogenous mixture was molded into standard test bars of the same dimensions described in Example 1, and these bars were then tested in the same manner. The resulting values for the impact strength and notched impact strength according to DIN specification 53453 are contained in Table 3.

TABLE 3

Relative viscosity of the polyester _____ 1.75
Notched impact strength in cm. kg./cm.$^2$:
  Before heat treatment _____ 7.6
  After 60 min. at 140° C. _____ 4.6
Impact strength in cm. kg./cm.$^2$:
  Before heat treatment _____ 210(30)
  After 60 min. at 140° C. _____ 210(30)

Compared with the values measured on injection molded test bars made from unmodified polyethylene terephthalate, the impact resistance of the modified polyester product is more than four times as high as clearly indicated by referring to the test results of Table 1.

EXAMPLE 4

Several samples of dried polyethylene terephthalate chips having a relative viscosity of 1.75 were mixed with varying amounts of from 1 to 50 percent by weight of polyethylene particles having a density of 0.918, melted and homogenized in a double screw extruder at 280° C., formed into strands and granulated after having been resolidified. The resulting granules, dried to values of below 0.01% water content, were molded into test bars by means of a piston operated injection molding machine. The cylinder temperature of the injection molding machine could be considerably lowered with increasing amounts of polyethylene added as the modifying agent. While a cylinder temperature of 260° C. was required in processing unmodified polyethylene terephthalate, it was possible to lower the cylinder temperature to 250° C. when modifying the polyester with 2.5% by weight of polyethylene. With an added amount of 40 percent by weight of polyethylene the required cylinder temperature was only 220° C. The initial standard test bars were subjected for one hour to a temperature of 140° C., and the notched impact strength was then determined according to DIN 53453 with striking pendulum 0.4 in accordance with DIN 51222. Table 4 below contains the test results measured as the arithmetic average of 30 samples for each value.

TABLE 4

Polyethylene added to polyester, percent by weight:

Notched impact stregnth in cm. kg./cm.$^2$ after 60 min. at 140° C.
0 _____ 2.0
1 _____ 2.2
2.5 _____ 2.3
10 _____ 4.1
25 _____ 4.8
30 _____ 4.1
40 _____ 3.4
50 _____ 4.1

This table again shows the superiority of the process according to the invention. Additional tests showed that one can also work with even larger amounts of polyethylene. However, with moldings having more than 50 percent by weight of polyethylene, there may occur an undesirable fibrillation.

In the above-noted copending application, dimensional stability at elevated temperatures of the injection molded polyester is improved by the addition of up to 10 percent by weight of high molecular weight polypropylene or poly-4-methylpentene. With this technique, it is possible to achieve injection moldings which keep their shape and remain practically unchanged in form even at temperatures above the second order transition point of the polyester. However, the impact strength of injection molded parts made out of such a modified polyethylene terephthalate is lower than the impact strength of injection moldings of an unmodified polyethylene terephthalate. This distinction is shown for purposes of comparison in the following example.

EXAMPLE 5

Following the same procedure as in the previous examples, 5 percent by weight of polypropylene was homogeneously melt blended with various samples of polyethylene terephthalate having different relative viscosities. The melt blended mixture was then injection molded to form standard test bars which were then tested for impact strength in accordance with DIN-specification 53453 after the test bars had been subjected to a temperature of 140° C. for 60 minutes. The results of this test series are listed in Table 5 wherein each value of impact strength is based upon an average of 30 test samples.

TABLE 5

| Relative viscosity of the polyester | Impact-strength in cm. kg./cm.² | |
|---|---|---|
| | Polyester unmodified | Polyester modified |
| 1.53 | 34.2 | 32.7 |
| 1.57 | 58.7 | 51.3 |
| 1.65 | 98.0 | 84.0 |
| 1.80 | 197.0 | 151.0 |

From the data of Table 5, it will be apparent that the addition of polypropylene causes a decrease in the impact resistance of the injection moldings, this decrease becoming more pronounced with increasing relative viscosity of the initial polyester. Similar comparative tests with the addition of poly-4-methylpentene likewise resulted only in an improvement of the dimensional stability of the molded articles without any improvement of impact strength. It was therefore quite surprising to discover that the addition of polyethylene to the polyester within the scope of this invention would permit a very substantial increase in the impact strength of the injection molded products.

Especially favorable results in terms of achieving both good dimensional stability and high impact strength have been achieved in tests carried out with the addition of up to about 5% by weight of polypropylene or poly-4-methylpentene to the polyethylene-containing injection molding composition. In this case, it is especially desirable to use at least 5 up to about 40% by weight of polyethylene, and most preferably about 10 to 30% by weight of polyethylene, all percentages being taken with reference to the initial polyethylene terephthalate.

EXAMPLE 6

As described in the previous examples polyethylene terephthalate was mixed in granular form with 5 percent by weight of polypropylene and 10 percent by weight of polyethylene having a density of 0.918 and homogenized by melt blending. From this material standard test bars were formed by injection molding and tested in the usual manner. Compared with the modified polyester listed in Table 5 these test bars showed a 50 to 100 percent higher impact strength.

From the foregoing description, it will be noted that the selection of polyethylene as the modifying agent for polyethylene terephthalate leads to unexpectedly impact-resistant injection molded products. It is possible without any difficulty to triple the impact strength of polyester injection moldings. In fact, the impact resistance frequently reaches such high values that even under standard test conditions all of the test bars remain unbroken as occurred, for example, in Example 3 above. The present invention therefore provides injection molded polyester articles which are well adapted for commercial and technical use under conditions requiring high impact strength. The notched impact strength of the molded articles is also quite high, thereby permitting the injection molded polyester to be used in such applications as protective housings which are subjected to great stress or in machine parts used for transmitting power. Of course, the injection molded polyesters of the present invention are also quite suitable for manufacturing high quality household goods. Furthermore, because the polyethylene modifying agent has such a strong effect on the impact resistant characteristics of the injection moldings, any number of valuable articles can be manufactured by taking advantage of the relatively low viscosity of the modified polyethylene terephthalate. Moreover, the addition of polyethylene to the polyethylene terephthalate offers the advantage that injection molding compositions can be formed wherein increasing amounts of the polyethylene permit the molding temperature to be substantially decreased with a corresponding facilitation of the molding procedure and with less possibility of damage which might be caused by overheating. Finally, by using a combination of polyolefins essentially including both polyethylene and polypropylene or poly-4-methylpentene, it is possible to achieve especially desirable injection molded products exhibiting excellent properties of both dimensional stability and impact resistance.

The invention is hereby claimed as follows:

1. A process for making an impact-resistant injection molded polyethylene terephthalate product which comprises: injection molding said polyethylene terephthalate as a molten composition in which there has been melt blended and homogeneously distributed from 0.5 to 50% by weight of finely divided polyethylene having a molecular weight of about 10,000 to 70,000 and a specific weight of about 0.915 to 0.930.

2. A process as claimed in claim 1 wherein said polyethylene terephthalate injection molding composition contains from about 10 to 30% by weight of polyethylene.

3. A process as claimed in claim 1 wherein said polyethylene terephthalate has a relative viscosity of about 1.8 to 2.1.

4. A process as claimed in claim 1 wherein said polyethylene terephthalate injection molding composition also contains melt blended and homogeneously distributed therein from 1 to 5% by weight of a finely divided polyolefin selected from the class consisting of polypropylene and poly-4-methylpentene.

5. A process for making an impact-resistant injection molded polyethylene terephthalate product which comprises: incorporating into and homogeneously melt blending with said polyethylene terephthalate which has a relative viscosity of about 1.8 to 2.1 from about 5 to 40% by weight of a finely divided polyethylene which has a molecular weight of about 10,000 to 70,000 and a specific weight of about 0.915 to 0.930, and injection molding the resulting polyethylene-containing polyethylene terephthalate as a molten injection molding composition into an article of predetermined configuration.

6. A process as claimed in claim 5 wherein said polyethylene terephthalate injection molding composition also contains melt blended and homogeneously distributed therein from 1 to 5% by weight of a finely divided polyolefin selected from the class consisting of polypropylene and poly-4-methylpentene.

7. A process as claimed in claim 5 wherein said injection molded article is subsequently heat set at a temperature of above about 100° C.

8. A process as claimed in claim 6 wherein said injection molded article is subsequently heat set at a temperature of above about 100° C.

References Cited

UNITED STATES PATENTS

| 3,152,380 | 10/1964 | Martin | 28—72 |
| 3,256,367 | 6/1966 | Jayne | 260—889 |
| 3,257,489 | 6/1966 | Heffelfinger | 264—235 |
| 3,322,854 | 5/1967 | Yasui et al. | 260—873 |

FOREIGN PATENTS

| 1,282,373 | 12/1961 | France. |

MURRAY TILLMAN, *Primary Examiner.*

J. T. GOOLKASIAN, *Assistant Examiner.*